July 28, 1959 — E. STUMP — 2,896,941
LAMINATED SPRING
Filed Sept. 12, 1955

INVENTOR
EUGEN STUMP

BY Dicke and Craig
ATTORNEYS

United States Patent Office 2,896,941
Patented July 28, 1959

2,896,941

LAMINATED SPRING

Eugen Stump, Stuttgart-Unterturkheim, Germany, assignor to Daimler-Benz Aktiengesellschaft, Stuttgart-Unterturkheim, Germany Application September 12, 1955, Serial No. 533,830

Claims priority, application Germany September 10, 1954

1 Claim. (Cl. 267—49)

The present invention relates to new and useful improvements in laminated springs, particularly for vehicles in which the individual spring leaves are separated from each other by layers which are either adhesively connected with the spring leaves or interposed between them.

In operation such intermediate layers are subjected not only to pressure but also to friction. Therefore, it is necessary that they be securely connected to the individual spring leaves and be capable of withstanding pressure, and also to be wear-resistant. For the latter purpose it is of great importance that the respective material of these layers possesses self-lubricating qualities. Prior to this invention it was proposed to make such intermediate layers of synthetic resins, or to vulcanize a rubber solution upon each spring leaf so as to form a coating thereon. Such layers of synthetic resin or rubber do, however, not possess the required qualities to a sufficient extent, and those made of synthetic resin as previously known have the further disadvantage that they require special means for securing them to the spring leaves.

It is an object of the present invention to provide the individual spring leaves of a laminated spring with a cover or coating of materials which are normally viscous but soft and which, when heated or dissolved in known solvents, will be sufficiently fluid so as to be easily sprayed upon the individual spring leaves and then to solidify thereon so as to form a highly adhesive, wear-resistant coating on each spring leaf.

According to the present invention, such material preferably consists of polyamides, such as "Nylon," "Perlon," or the like. These materials when applied to the spring leaf in a heated condition adhere very strongly thereto so that no additional connecting means will be required, and dust and dirt cannot enter between the springs. Since these materials are highly water-repellent, the individual spring leaves will also be securely protected from corrosion.

The present invention may be applied in various manners. The individual spring leaves may be entirely coated with "Nylon," "Perlon," or the like, or the coating may only be applied to one side of each spring leaf. Furthermore, each set of springs may consist of spring leaves which are coated alternately on one side and on both sides, respectively.

Figure 1:
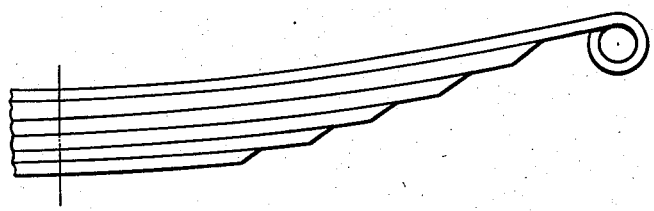
Figure 2:
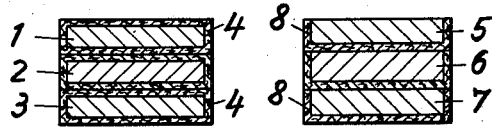
Figure 3:
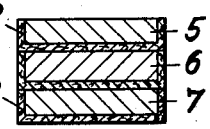
Figure 4:
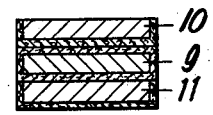

Further objects, features, and advantages of the present invention will be apparent from the following detailed description thereof and the accompanying drawings, in which Fig. 1 shows a front view of one end of a laminated spring according to the present invention; while Figs. 2 to 4 show vertical cross sections through three adjacent spring leaves, and illustrate three different forms in which the inventive coating may be applied.

Referring to Fig. 2 of the drawings, the individual spring leaves 1, 2, and 3 of a laminated spring are provided along their entire outer surface with a coating 4 of "Nylon," "Perlon," or the like, which may be sprayed thereon so that each spring leaf will be separated from the adjacent leaf by two layers of "Nylon" or the like.

In the embodiment of the invention shown in Fig. 3, a coating 8 of the type as described is applied only upon the outwardly curved side of each spring leaf 5, 6, and 7. However, the coating 8 also covers the edge portions of the spring leaves so as to prevent any entry of dust or moisture and to protect the spring leaves therefrom.

In the embodiment of the invention shown in Fig. 4, the individual laminations are superimposed upon each other so that one spring leaf 9 which is completely coated with "Nylon," "Perlon," or the like is interposed between two spring leaves 10 and 11 which are coated only on one side and along their edges. The thickness of the individual coatings relative to that of the spring leaves has been magnified in the drawings for a better illustration of the invention. Generally speaking, each individual coating does not need to be thicker than .1 to .2 mm. in order to increase the useful life of the set of springs many times over one which is not so covered.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

A laminated leaf spring assembly comprising a plurality of curved spring leaves superimposed upon each other and a coating of normally viscous nylon applied only to the convex surfaces of each of said leaves and also around its edges, said coating being applied to said spring leaves individually by spraying so as to form, when solidified, a strongly adhering, wear resistant, moisture-proof and protective coating on the exposed surfaces of the lowermost leaf, the surfaces between each pair of leaves and the edges of the leaves.

References Cited in the file of this patent

UNITED STATES PATENTS

| | | |
|---|---|---|
| 1,967,088 | Geyer | July 17, 1934 |
| 2,649,296 | Dow | Aug. 18, 1953 |
| 2,667,347 | Jacobs | Jan. 26, 1954 |